(12) United States Patent
Deller et al.

(10) Patent No.: US 9,029,454 B2
(45) Date of Patent: May 12, 2015

(54) AQUEOUS POLYMER DISPERSIONS

(71) Applicant: Celanese Emulsions GmbH, Sulzbach (Taunus) (DE)

(72) Inventors: Christoph Deller, Mainz (DE); Argiri Tsami-Schulte, Kelkheim (DE); Stephan Krieger, Hofheim (DE); Ulrich Desor, Idstein (DE); Marc Ratering, Liederbach am Taunus (DE)

(73) Assignee: Celanese Emulsions GmbH, Sulzbach (DE)

( * ) Notice: Subject to any disclaimer, the term of this patent is extended or adjusted under 35 U.S.C. 154(b) by 31 days.

(21) Appl. No.: 13/740,440

(22) Filed: Jan. 14, 2013

(65) Prior Publication Data
US 2013/0190448 A1   Jul. 25, 2013

Related U.S. Application Data

(60) Provisional application No. 61/588,297, filed on Jan. 19, 2012.

(51) Int. Cl.
| | | |
|---|---|---|
| *C08L 51/00* | (2006.01) | |
| *C08F 2/26* | (2006.01) | |
| *C09D 151/00* | (2006.01) | |
| *C09D 133/12* | (2006.01) | |
| *C08F 2/38* | (2006.01) | |
| *C08F 220/14* | (2006.01) | |
| *C08F 220/18* | (2006.01) | |
| *C08F 265/06* | (2006.01) | |

(52) U.S. Cl.
CPC ............. *C09D 133/12* (2013.01); *C08F 2/38* (2013.01); *C08F 220/14* (2013.01); *C08F 220/18* (2013.01); *C08F 265/06* (2013.01); *C08F 2/26* (2013.01); *C09D 151/003* (2013.01); *C08L 51/003* (2013.01)

(58) Field of Classification Search
CPC   C09D 133/12; C09D 151/003; C08L 51/003; C08F 2/26
USPC ............................ 524/833, 460; 526/201, 203
See application file for complete search history.

(56) References Cited

U.S. PATENT DOCUMENTS

| 6,005,042 | A | 12/1999 | Desor et al. |
| 6,277,910 | B1 | 8/2001 | Rassing et al. |
| 6,710,112 | B1 * | 3/2004 | Sandor et al. ................. 524/458 |
| 2002/0090459 | A1 * | 7/2002 | Even .......................... 427/385.5 |
| 2008/0275165 | A1 | 11/2008 | Balk et al. |
| 2009/0004394 | A1 | 1/2009 | Koller et al. |

FOREIGN PATENT DOCUMENTS

WO   2011082965 A2   7/2011

* cited by examiner

*Primary Examiner* — Kelechi Egwim
(74) *Attorney, Agent, or Firm* — Roberts Mlotkowski Safran & Cole P.C.

(57) ABSTRACT

An aqueous polymer composition is described comprising a homogeneous acrylic polymer dispersion produced by emulsion polymerization of a monomer mixture comprising: (A) from 85 to 99.9 wt % of one or more main monomers selected from $C_1$-$C_{12}$-alkyl esters of acrylic acid or $C_5$-$C_{12}$-alkyl esters of methacrylic acid, styrene, and vinyl toluene in such a ratio as to produce a polymer having a Tg in the range of −20 to +65° C.; and (B) from 0.1 to 5 wt % of at least one stabilizing monomer selected from ethylenically unsaturated monocarboxylic acids or amides thereof, ethylenically unsaturated dicarboxylic acids or anhydrides or amides thereof, ethylenically unsaturated sulfonic acids, ethylenically unsaturated phosphoric acids, and ethylenically unsaturated phosphonic acids. The emulsion polymerization is conducted in the presence of 0.05 to 3 wt %, based on the total weight of monomers in the monomer mixture, of a chain transfer agent (C).

19 Claims, No Drawings

AQUEOUS POLYMER DISPERSIONS

CROSS REFERENCE TO RELATED APPLICATIONS

This application claims the benefit of the filing date of U.S. Provisional Application No. 61/588,297 filed Jan. 19, 2012, the entire contents of which are incorporated herein by reference.

FIELD

The present invention relates to aqueous polymer dispersions and their use in protective and decorative coatings.

BACKGROUND

Recent years have seen an increase in the level of regulatory control over the amount and/or types of pollutants and emissions that are released into the environment on an ongoing basis. For instance, in the past decade, regulations of volatile organic compound (VOC) emissions have become stricter, especially with respect to solvent borne coating systems. See e.g., Directive 2004/42/CE of The European Parliament and The Council of The European Union. Moreover, the use of cobalt driers, which are commonly employed in solvent borne systems, has also been restricted. See e.g., Directive 98/98/EC of The Commission of The European Communities. Therefore, in order to satisfy regulations requiring low VOC and cobalt free coatings, waterborne coatings are often looked to as replacements for solvent borne coatings.

Aqueous polymeric acrylic/alkyd hybrid emulsions are an example of such waterborne coatings. These hybrid emulsions advantageously combine low VOC emissions with application properties similar to solvent and water borne alkyds, with the added possibility to formulate without the use of drying agents. The alkyd component of the hybrid emulsion advantageously influences the open time, gloss, flow, haze and substance wetting of the final product; whereas the acrylate component advantageously influences the early blocking resistance, outdoor durability, and reduces yellowing. One challenge in developing these aqueous polymeric acrylic/alkyd hybrid emulsions is in enhancing the compatibility of two basically immiscible systems.

U.S. Patent Application Publication No. 2009/0004394 to Koller et al. ("Koller") discloses an aqueous polymeric composition comprising an emulsion polymer, which includes, as copolymerized units, carbonyl-functional ethylenically-unsaturated monomers and an autoxidizable material, wherein the polymeric composition is free of any copolymerized carbonyl-functional monomer reactive amine and hydrazine functional groups.

U.S. Pat. No. 6,277,910 B1 discloses a hybrid binder with a dry-solids content of greater than 60%. The blend contains an acrylic dispersion, a surfactant with protective colloids, and an emulsifiable resin. However, one drawback of this hybrid binder is the usage of a cobalt drier, as discussed above. Furthermore, mandatory classification of formulations containing cobalt driers have created significant manufacturing burdens regarding packaging and labeling requirements, at a minimum. See e.g., Dangerous Substances Directive (Directive 67/548/EEC) of The European Union.

International Patent Publication No. WO2011082965A2 discloses a process for producing a water-based alkyd-acrylic hybrid binder with low residual monomer content. The dispersion is obtained by free radical emulsion polymerization of at least one α, β,-unsaturated monomer (M) and optionally at least one further monomer (M1). The addition of the alkyd resin or polyurethane-alkyd emulsion is done after the polymerization of M and M1 under stirring and a temperature between 60-99° C. The high temperature required for incorporation of the alkyd resin has a negative influence on cost saving and carbon footprint.

In accordance with the invention, a new aqueous acrylic polymer dispersion has been developed which shows enhanced compatibility with alkyd resins when formulated into a hybrid acrylic/alkyd binder system. Moreover, even at low concentrations of the more expensive alkyd component, the resultant hybrid binder can be used to produce decorative coatings with the same gloss level and low haze value as pure alkyd resins but with reduced yellowing and improved blocking resistance and without the use of drying agents.

SUMMARY

In one aspect, the invention resides in an aqueous polymer composition comprising a homogeneous polymer dispersion produced by emulsion polymerization of a monomer mixture comprising:

(A) from 85 to 99.9 wt %, based on the total weight of monomers in the mixture, of one or more main monomers selected from $C_1$-$C_{12}$-alkyl esters of acrylic acid or $C_5$-$C_{12}$-alkyl esters of methacrylic acid, styrene, and vinyl toluene in such a ratio as to produce a polymer having a Tg in the range of −20 to +65° C., preferably 10 to 50° C., and most preferably in the range of 15° C. to 30° C.; and (B) from 0.1 to 5 wt %, preferably from 0.5 to 5 wt %, and most preferably from 1 to 3 wt %, based on the total weight of monomers in the mixture, of at least one stabilising monomer selected from ethylenically unsaturated monocarboxylic acids or amides thereof, ethylenically unsaturated dicarboxylic acids or anhydrides or amides thereof, ethylenically unsaturated sulfonic acids, ethylenically unsaturated phosphoric acids, and ethylenically unsaturated phosphonic acids, wherein the emulsion polymerization is conducted in the presence of 0.05 to 3 wt %, preferably 0.5 to 2 wt %, based on the total weight of monomers in the monomer mixture, of a chain transfer agent (C).

In a further aspect, the invention resides in an aqueous polymer composition comprising a heterogeneous polymer dispersion prepared by a stepwise emulsion polymerization process comprising polymerizing in a first stage a first monomer composition comprising:

(A1) from 50 to 80% by weight of at least one main monomer whose homopolymer has a glass transition temperature below about 0° C.;

(A2) from 19.3 to 50% by weight of at least one main monomer whose homopolymer has a glass transition temperature above about 65° C.; and (B) from 0.5 to 5% by weight of at least one stabilising monomer selected from ethylenically unsaturated monocarboxylic acids or amides thereof, ethylenically unsaturated dicarboxylic acids or anhydrides or amides thereof, ethylenically unsaturated sulfonic acids, ethylenically unsaturated phosphoric acids, and ethylenically unsaturated phosphonic acids; and wherein the first polymerization stage is conducted in the presence of 0.05 to 3 wt %, preferably 0.5 to 2 wt %, based on the total weight of monomers in the first monomer composition, of a chain transfer agent (C) to produce a first polymer phase having a Tg less than or equal to 20° C., more preferably less than or equal to 0° C. and most preferably less than or equal to −20° C.; and polymerizing in a second stage, and in the presence of the first polymer phase, a second monomer composition comprising:

(A1) from 5 to 45% by weight at least one monomer whose homopolymer has a glass transition temperature below about 0° C.; and (A2) from 65 to 90% by weight at least one monomer whose homopolymer has a glass transition temperature above about 65° C. to produce a second polymer phase having a Tg of at least 40° C., more preferably at least 50° C. and most preferably at least 60° C.

Typically, the difference in glass transition temperature between the first and second polymer phases is at least 20° C.

Conveniently, the at least one main monomer (A1) is selected from at least one of a $C_1$-$C_{12}$-alkyl ester of acrylic acid and a $C_5$-$C_{12}$-alkyl ester of methacrylic acid; and the at least one main monomer (A2) is selected from at least one of styrene, vinyltoluene, acrylonitrile, methacrylonitrile, and $C_1$-$C_4$-alkyl esters or cycloalkyl esters of methacrylic acid Conveniently, the weight ratio of the first polymer phase to the second copolymer phase is from 50:50 to 75:25.

Generally, the chain transfer agent (d) comprises a mercaptan.

In one embodiment, the aqueous polymer composition also includes an aqueous autoxidable material comprising an alkyd resin. Typically, the polymer dispersion of the invention is present in the aqueous polymer composition in an amount from about 50 weight percent to about 90 weight percent based on the total weight of the polymer composition and the aqueous autoxidable material is present in an amount from about 10 weight percent to about 50 weight percent based on the total weight of the polymer composition.

In yet a further aspect, the invention resides in an aqueous coating composition, such as a paint, comprising the aqueous polymer composition described herein.

DETAILED DESCRIPTION

Described herein is an aqueous polymer composition comprising an acrylic polymer dispersion composed of particles of one or more acrylic polymer phases, wherein at least one of the polymer phases is produced in the presence of a chain transfer agent. By controlling the Tg of the or each polymer phase, it is possible to produce a polymer dispersion which shows enhanced compatibility with alkyd resins and which, when formulated into a hybrid acrylic/alkyd binder system, allows the production of decorative coatings with a high gloss and low haze without the use of drying agents.

In one embodiment, the particles of the acrylic polymer dispersion comprise a single homogeneous polymer phase produced by emulsion polymerization of a monomer mixture comprising (A) from 85 to 99.9 wt %, based on the total weight of monomers in the mixture, of one or more main monomers selected from $C_1$-$C_{12}$-alkyl esters of acrylic acid or $C_5$-$C_{12}$-alkyl esters of methacrylic acid, styrene, and vinyl toluene in such a ratio as to produce a polymer having a Tg in the range of −20 to +65° C., preferably 10 to 50° C., and most preferably in the range of 15° C. to 30° C.

The monomer mixture used to produce the homogeneous phase dispersion also comprises at least one stabilizing monomer (B) selected from ethylenically unsaturated monocarboxylic acids or amides thereof, ethylenically unsaturated dicarboxylic acids or anhydrides or amides thereof, ethylenically unsaturated sulfonic acids, ethylenically unsaturated phosphoric acids, and ethylenically unsaturated phosphonic acids. The at least one stabilising monomer is present in an amount from 0.1 to 5 wt %, preferably from 0.5 to 5 wt %, and most preferably from 1 to 3 wt %, based on the total weight of monomers in the mixture.

In addition to the monomers A and B, the monomer mixture contains from 0.05 to 3 wt %, preferably 0.5 to 2 wt %, of a chain transfer agent (C), based on the total weight of monomers in the monomer mixture.

In another embodiment, the particles of the acrylic polymer dispersion comprise a plurality of different polymer phases produced by a stepwise emulsion polymerization process comprising at least a first polymerization stage and a second polymerization stage conducted sequentially.

The first polymerization stage involves polymerizing a first monomer composition comprising:

(A1) from 50 to 80% by weight, preferably from 55 to 60% by weight, based on the total weight of monomers in the first monomer composition, of at least one main monomer whose homopolymer has a glass transition temperature below about 0° C.;

(A2) from 19.3 to 50% by weight, preferably from 35 to 45 percent by weight, based on the total weight of monomers in the first monomer composition, of at least one main monomer whose homopolymer has a glass transition temperature above about 65° C.; and (B) from 0.5 to 5% by weight, preferably from 1 to 3 percent by weight, based on the total weight of monomers in the first monomer composition, of at least one stabilising monomer selected from ethylenically unsaturated monocarboxylic acids or amides thereof, ethylenically unsaturated dicarboxylic acids or anhydrides or amides thereof, ethylenically unsaturated sulfonic acids, ethylenically unsaturated phosphoric acids, and ethylenically unsaturated phosphonic acids.

In addition, the first polymerization stage is conducted in the presence of 0.05 to 3 wt %, preferably 0.5 to 2 wt %, based on the total weight of monomers in the first monomer composition, of a chain transfer agent (C).

The product of the first polymerization stage is a first polymer phase having a Tg less than or equal to 20° C., more preferably less than or equal to 0° C. and most preferably less than or equal to −20° C.

In the second polymerization stage, a second monomer phase is polymerized in the presence of the first polymer phase, wherein the second monomer phase comprises:

(A1) from 5 to 45% by weight, preferably from 15 to 30% by weight, based on the total weight of monomers in the second monomer composition, of at least one main monomer whose homopolymer has a glass transition temperature below about 0° C.;

(A2) from 65 to 90% by weight, preferably from 75 to 85% by weight, based on the total weight of monomers in the second monomer composition, of at least one main monomer whose homopolymer has a glass transition temperature above about 65° C.;

(B) optionally up to 4% by weight, preferably from 1 to 2% by weight, based on the total weight of monomers in the second monomer composition, of at least one stabilising monomer selected from ethylenically unsaturated monocarboxylic acids or amides thereof, ethylenically unsaturated dicarboxylic acids or anhydrides or amides thereof, ethylenically unsaturated sulfonic acids, ethylenically unsaturated phosphoric acids, and ethylenically unsaturated phosphonic acids.

In some embodiments, the second polymerization stage is conducted in the absence of a chain transfer agent (C), whereas in other embodiments the second monomer composition contains up to 5% by weight, more preferably up to 1.5% by weight, based on the total weight of monomers in the second monomer composition, of a chain transfer agent (C). When both monomer compositions contain a chain transfer agent, it is preferable that the ratio of the amount of chain transfer agent used in the polymerization of the first monomer composition to the amount of chain transfer agent used in the polymerization of the second monomer composition is greater than 1:1, such as in the range 1.5 to 10:1.

The product of the second polymerization stage is a second polymer phase having a Tg of at least 40° C., more preferably at least 50° C. and most preferably at least 60° C. Typically, the difference in glass transition temperature between the first and second polymer phases is at least 20° C. In addition, the weight ratio of the first polymer phase to the second copolymer phase is from generally from 50:50 to 75:25.

Suitable monomers (A1) for each of the first and second monomer compositions comprise at least one $C_1$-$C_{12}$-alkyl ester of acrylic acid and/or at least one $C_5$-$C_{12}$-alkyl ester of methacrylic acid, for example butyl acrylate, n-octyl acrylate and 2-ethylhexyl acrylate. Suitable monomers (A2) comprise at least one of styrene, vinyltoluene, acrylonitrile, methacrylonitrile, and $C_1$-$C_4$-alkyl esters or cycloalkyl esters of methacrylic acid, for example methyl methacrylate, cyclohexyl methacrylate, isobornyl methacrylate and tert-butyl methacrylate. The first and second monomer compositions can employ different monomers (A1) and (A2).

Suitable stabilizing monomers (B) for the first monomer composition and, where applicable, the second monomer composition, include ethylenically unsaturated $C_3$-$C_8$ monocarboxylic acids, such as acrylic acid, methacrylic acid and crotonic acid, and the anhydrides and amides thereof, and ethylenically unsaturated $C_4$-$C_8$ dicarboxylic acids, maleic acid, fumaric acid, itaconic acid and citraconic acid, and the anhydrides and mono- or bisamides thereof. Examples of suitable ethylenically unsaturated sulfonic acids include those having 2-8 carbon atoms, such as vinylsulfonic acid, 2-acrylamido-2-methylpropanesulfonic acid, 2-acryloyloxyethanesulfonic acid and 2-methacryloyloxyethanesulfonic acid, 2-acryloyloxy- and 3-methacryloyloxypropanesulfonic acid and vinylbenzenesulfonic acid. Examples of suitable ethylenically unsaturated phosphoric acids also include those having 2-8 carbon atoms, such as vinylphosphonic acid. In addition to or instead of said acids, it is also possible to use the salts thereof, preferably the alkali metal or ammonium salts thereof, particularly the sodium salts thereof, such as, for example, the sodium salts of vinylsulfonic acid and of 2-acrylamidopropanesulfonic acid. The first and second monomer compositions can employ different monomers (B).

Suitable chain transfer agents (C) for the first monomer composition and, where applicable, the second monomer composition, include mercaptans and particularly alkyl thiols such as methylthiol, ethylthiol, n-propylthiol, n-butylthiol, n-hexylthiol, n-octylthiol, n-decylthiol, n-dodecylthiol, n-tetradecylthiol, n-hexadecylthiol, n-octadecylthiol, cyclohexylthiol, isopropylthiol, tert-butylthiol, tert-nonylthiol, and tert-dodecylthiol. The first and second monomer compositions can employ different chain transfer agents (C).

Each of the first and second monomer compositions may further include up to 10% by weight, more preferably from 3 to 7% by weight, based on the total weight of monomers in the respective monomer composition, of an adhesion promoting monomer in the form of at least one ethylenically unsaturated compound containing one or more carbonyl groups, such as keto groups and/or aldehyde groups. Examples include diacetone acrylamide, vinyl alkyl ketones having 4 to 7 carbon atoms such as vinyl methyl ketone, vinyl ethyl ketone or vinyl butyl ketone, diacetone acrylate, acetonitrile acrylate, diacetone methacrylate, 2-hydroxypropyl acrylate acetyl acetate and butanediol-1,4-acrylate acetyl acetate. A preferred adhesion promoting monomer is diacetone acrylamide (DAAM).

The present invention also provides a process for preparing a polymer dispersion as described above by step-wise emulsion polymerization. The step-wise emulsion polymerization preferably is carried out in accordance with the customary techniques of emulsion polymerization. Preferably, the process of step-wise emulsion polymerization is carried out by first emulsifying and polymerizing the first monomer composition in an aqueous phase in the presence of emulsifiers, initiators and, if desired, protective colloids, at suitable temperatures of, for example, from about 60° C. to about 95° C., and subsequently polymerizing the second monomer composition in the presence of the first copolymer, at suitable temperatures of, for example, from about 60° C. to about 95° C., with the aid of an initiator. It is preferred to operate in accordance with an emulsion feed technique, in which at least a part of the first monomer composition and thereafter at least a part of the second monomer composition are metered in, preferably in the form of an aqueous emulsion. A fraction of either the first monomer composition, the second monomer composition or a combination of both may be prepolymerized prior to metering in the remaining parts of the monomer compositions.

The emulsion polymerization process is typically conducted in the presence of one or more surfactants and/or protective colloids. Thus, the aqueous monomer mixture may contain up to about 3 percent by weight, preferably up to about 2 percent by weight, more preferably from about 0.5 to about 1 percent by weight of ionic surfactants and/or up to about 6 percent by weight, preferably up to about 4 percent by weight, and more preferably from about 0.5 to about 2 percent by weight of nonionic surfactants. Suitable nonionic surfactants include alkylpolyglycol ethers, such as ethoxylation products of lauryl, oleyl or stearyl alcohol or of coconut fatty alcohol; alkyl phenol polyglycol ethers, such as ethoxylation products of octylphenol or nonylphenol, diisopropylphenol, triisopropylphenol or of di- or tri-tert-butyl phenol; or ethoxylation products of polypropylene oxide. Suitable ionic emulsifiers include primarily anionic emulsifiers. These anionic emulsifiers may comprise the alkali metal or ammonium salts of alkyl-, aryl- or alkylaryl-sulfonates or of alkyl, aryl or alkylaryl sulfates, phosphates or phosphonates, whereby it also is possible for oligo- or polyethylene oxide units to be located between the hydrocarbon radical and the anionic group. Suitable anionic surfactants include those of formula 1a or 1b:

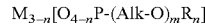  1a

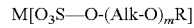  1b where n is 1 or 2; m is an integer from 0 to 15; M is selected from the group consisting of hydrogen, an alkali metal ion, and an ammonium ion; Alk is $C_2$-C3-alkylene; and R is selected from the group consisting of a $C_8$-$C_{30}$ alkyl and a $C_4$-$C_{30}$ alkylphenyl. Typical examples include sodium lauryl sulfate, sodium undecylglycol ether sulfate, sodium octylphenol glycol ether sulfate, sodium dodecylbenzene sulfonate, sodium lauryldiglycol sulfate, and ammonium tri-tert-butylphenol-penta- or -octaglycol sulfate.

Useful protective colloids, if present, include natural substances such as gum arabic, starch, alginates or modified natural substances, e.g., methyl-, ethyl-, hydroxyalkyl- or carboxymethylcellulose, or entirely synthetic substances, examples being polyvinyl alcohol and polyvinyl pyrrolidone.

With the described monomer systems, the amount of these protective colloids is typically from 0.001 to about 1 percent by weight.

Any known mechanisms may be employed for initiating and continuing the polymerization. Preferably, oil-soluble and/or, water-soluble free-radical initiators or redox systems can be used. More preferably, water-soluble free-radical initiators or redox systems are used. Suitable examples of these initiators include hydrogen peroxide, potassium or ammonium peroxodisulfate, dibenzoyl peroxide, lauryl peroxide, tri-tert-butyl peroxide, bisazodiisobutyronitrile, alone or together with reducing components, for example sodium bisulfite, sodium dithionite, sodium hydroxymethylsulfinate, glucose, ascorbic acid, tartaric acid.

The dispersions usually are neutralized with aqueous ammonia, alkali metal and alkaline earth metal hydroxide solutions and can be adjusted to a pH of from 6.5 to 10, preferably from 7.0 to 9.0.

The resulting polymer dispersion has at least two phases with different glass temperatures in the range between about −20° C. and about 50° C., wherein the difference in the Tg between the at least two phases is at least 20° C. In one embodiment, the average particle diameter ranges between about 60 nm and about 150 nm.

Where the monomer system used to produce the polymer dispersion comprises an adhesion promoting monomer containing one or more carbonyl groups, a water-soluble cross-linking agent may be added to the final dispersion. Such a cross-linking agent will react with carbonyl functionalities contained by the polymer as water is removed therefrom and as a film or coating is formed from the polymerized components. A type of water-soluble cross-linking agent that can be used in the compositions herein comprises a compound which contains at least two hydrazine moieties. Particularly suitable are dihydrazine compounds of aliphatic dicarboxylic acids of 2 to 10, in particular 4 to 6, carbon atoms, e.g., oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide and/or itaconic acid dihydrazide. Water-soluble aliphatic dihydrazines of 2 to 4 carbon atoms, e.g., ethylene-1,2-dihydrazine, propylene-1,3-dihydrazine or butylene-1,4-dihydrazine, are also suitable. Adipic acid dihydrazide (ADH) is a preferred water-soluble cross-linking agent for use in the compositions herein.

The resultant polymer dispersion shows excellent compatibility when blended with an aqueous autoxidable material such as an alkyd resin to make an acrylic/alkyd hybrid. The aqueous autoxidable material can be an acrylic- or urethane-modified alkyd resin. Compared to waterborne or solvent-borne alkyds the acrylic/alkyd hybrid (aqueous polymer composition) possesses good blocking resistance without the use of drying agents and also the low haze and high gloss typical for alkyd based systems. For example, a gloss level of at least 65 units at 20° C. is a criteria of good compatibility for an acrylic/alkyd hybrid binder in a gloss paint formulation. By using the multi phase acrylic emulsion described herein it is possible to produce an acrylic/alkyd hybrid binder which, when formulated into a gloss paint, achieves a very good gloss of >65 units at 20° C. and an improved blocking resistance.

The aqueous autoxidable material is preferably emulsified or self-emulsified with a particle diameter of less than about 300 nm. The aqueous autoxidizable material can be added to the polymer dispersion, for example, after the second stage of polymerization at a temperature of less than or equal to about 50° C. The aqueous autoxidable material can be present in an amount from about 10 to about 50 weight percent based on the total weight of the overall polymer composition (where the polymer dispersion is present in an amount from about 50 to about 90 weight percent).

Examples of preferred autoxidable materials are the products Synaqua® 4804, Synaqua® 2080, Synaqua® 6812 from Cray Valley, Synthalat PWL 926, Synthalat QMW 1552, Synthalat W46, Synthalat W48 from Synthopol, Resydrol® AZ 6190w/43WA, Resydrol® AZ 6185w/40WA, Resydrol® VAF 6111w/60WA, Resydrol® AZ 6191W/42A, Resydrol® AY 6151w/45WA from Cytec, and WorléeSol E 150 W, WorléeSol E 330 W, WorléeSol SE 420 W, WorléeSol 280 W, WorléeSol E 530 W, and WorléeSol E 927 W from Worlée.

The hybrid polymer composition can be used to produce a variety of coating compositions, including pigmented and unpigmented varnishes, stains and paints, especially gloss paints, for the coating of wood and other substrates. These coating materials can be produced using the customary additives, such as wetting agents, for example aminomethylpropanol, antifoams, for example silicones and mineral oils, thickeners based on polyacrylates or polyurethanes, waxes based on paraffin or polyethylene, film-forming auxiliaries, for example ®Texanol (Eastman) or butyldiglycol, pigments, for example titanium dioxide, fillers, dispersants, preservatives, matting agents and other additives which are known to the skilled worker.

The invention now will be explained by reference to the following non-limiting examples. The parts and percentages indicated in the examples below are by weight unless noted otherwise.

EXAMPLES

Example 1

Preparation of Polymer Composition 1 Based on a Multi Phase Emulsion

A 3-liter reactor fitted with a condenser, mechanical stirrer and thermometer was filled with 619.8 g of water, 32.2 g of sodium alkyl ether sulfate (28%, 7 ethylene oxide units) and heated to 80° C. while stirring. At 80° C. 4.6% of Feed 1 was added to the reactor, followed by a solution of 0.56 g of ammonium persulfate in 11.3 g of water. After 15 minutes of initial polymerization at 80° C., the remaining part of Feed 1 was added to the reactor over 115 minutes, immediately followed by the addition of Feed 2 over 95 minutes. Feed 3 was added to the reactor parallel to the consecutive additions of Feed 1 and Feed 2 over 210 minutes. The feed compositions are given in Table 1. After completion of the additions, the temperature was maintained at 80° C. for 30 minutes after which 12.3 g ammonia (12.5%) was added the reactor. The reactor content was held at 80° C. for another 30 minutes, then cooled to below 40° C. and another 12.3 g of ammonia (12.5%) was added. Finally Feed 4 was added at 50° C.

TABLE 1

|  | Feed 1 [g] | Feed 2 [g] | Feed 3 [g] | Feed 4 [g] |
| --- | --- | --- | --- | --- |
| Water | 263.05 | 215.22 | 48.07 |  |
| sodium alkyl ether sulfate (28%, 7 ethylene oxide units) | 22.14 | 18.11 | — |  |
| methyl methacrylate | 216.93 | 405.68 | — |  |
| butyl acrylate | 402.86 | 101.42 | — |  |
| methacrylic acid | 18.59 | 5.07 | — |  |
| acrylic acid | 9.36 | 2.59 | — |  |

TABLE 1-continued

|  | Feed 1 [g] | Feed 2 [g] | Feed 3 [g] | Feed 4 [g] |
|---|---|---|---|---|
| n-dodecyl mercaptan | 11.28 | 11.26 | — | |
| ammonium persulfate | — | — | 3.50 | |
| Resydrol AZ 6191 w/42WA | | | | 1546.81 |

Example 2

Preparation of Polymer Composition 2 Based on a Multi Phase Emulsion

A 3-liter reactor fitted with a condenser, mechanical stirrer and thermometer was filled with 625.6 g of water, 32.5 g of sodium alkyl ether sulfate (28%, 7 ethylene oxide units) and heated to 80° C. while stirring. At 80° C., 4.6% of Feed 1 was added to the reactor, followed by a solution of 0.57 g of ammonium persulfate in 11.4 g of water. After 15 minutes of initial polymerization at 80° C., the remaining part of Feed 1 was added to the reactor over 115 minutes, immediately followed by the addition of Feed 2 over 95 minutes. Feed 3 was added to the reactor parallel to the consecutive additions of Feed 1 and Feed 2 over 210 minutes. The feed compositions are given in Table 2. After completion of the additions, temperature was maintained at 80° C. for 30 minutes after which 12.4 g ammonia (12.5%) was added the reactor. The reactor content was held at 80° C. for another 30 minutes, then cooled to below 40° C. and another 12.4 g of ammonia (12.5%) was added. Finally Feed 4 was added at 50° C.

TABLE 2

|  | Feed 1 [g] | Feed 2 [g] | Feed 3 [g] | Feed 4 [g] |
|---|---|---|---|---|
| Water | 265.52 | 217.24 | 47.29 | |
| sodium alkyl ether sulfate (28%, 7 ethylene oxide units) | 22.34 | 18.28 | — | |
| methyl methacrylate | 218.96 | 409.48 | — | |
| butyl acrylate | 406.64 | 102.37 | — | |
| methacrylic acid | 18.77 | 5.12 | — | |
| acrylic acid | 9.45 | 2.61 | — | |
| n-dodecyl mercaptan | 0 | 0 | — | |
| ammonium persulfate | — | — | 3.50 | |
| Resydrol AZ 6191 w/42WA | | | | 1561.28 |

Example 3

Preparation of Polymer Composition 3 Based on a Multi Phase Emulsion

A 3-liter reactor fitted with a condenser, mechanical stirrer and thermometer was filled with 623.6 g of water 32.4 g of sodium alkyl ether sulfate (28%, 7 ethylene oxide units) and heated to 80° C. while stirring. At 80° C., 4.6% of Feed 1 was added to the reactor, followed by a solution of 0.57 g of ammonium persulfate in 11.3 g of water. After 15 minutes of initial polymerization at 80° C., the remaining part of Feed 1 was added to the reactor over 115 minutes, immediately followed by the addition of Feed 2 over 95 minutes. Feed 3 was added to the reactor parallel to the consecutive additions of Feed 1 and Feed 2 over 210 minutes. The feed compositions are given in Table 3. After completion of the additions, temperature was maintained at 80° C. for 30 minutes after which 12.3 g ammonia (12.5%) was added the reactor. The reactor content was held at 80° C. for another 30 minutes, then cooled to below 40° C. and another 12.3 g of ammonia (12.5%) was added. Finally, Feed 4 was added at 50° C.

TABLE 3

|  | Feed 1 [g] | Feed 2 [g] | Feed 3 [g] | Feed 4 [g] |
|---|---|---|---|---|
| Water | 264.68 | 216.55 | 47.14 | |
| sodium alkyl ether sulfate (28%, 7 ethylene oxide units) | 22.27 | 18.22 | — | |
| methyl methacrylate | 218.27 | 408.19 | — | |
| butyl acrylate | 405.36 | 102.05 | — | |
| methacrylic acid | 18.71 | 5.10 | — | |
| acrylic acid | 9.42 | 2.60 | — | |
| n-dodecyl mercaptan | 0 | 7.65 | — | |
| ammonium persulfate | — | — | 3.50 | |
| Resydrol AZ 6191 w/42WA | | | | 1556.36 |

Example 4

Preparation of Polymer Composition 4 Based on a Multi Phase Emulsion

A 3-liter reactor fitted with a condenser, mechanical stirrer and thermometer was filled with 622.4 g of water 32.3 g of sodium alkyl ether sulfate (28%, 7 ethylene oxide units) and heated to 80° C. while stirring. At 80° C. 4.6% of Feed 1 was added to the reactor, followed by a solution of 0.57 g of ammonium persulfate in 11.3 g of water. After 15 minutes of initial polymerization at 80° C., the remaining part of Feed 1 was added to the reactor over 115 minutes, immediately followed by the addition of Feed 2 over 95 minutes. Feed 3 was added to the reactor parallel to the consecutive additions of Feed 1 and Feed 2 over 210 minutes. The feed compositions are given in Table 4. After completion of the additions, temperature was maintained at 80° C. for 30 minutes after which 12.3 g ammonia (12.5%) was added the reactor. The reactor content was held at 80° C. for another 30 minutes, then cooled to below 40° C. and another 12.3 g of ammonia (12.5%) was added. Finally, Feed 4 was added at 50° C.

TABLE 4

|  | Feed 1 [g] | Feed 2 [g] | Feed 3 [g] | Feed 4 [g] |
|---|---|---|---|---|
| Water | 264.15 | 216.08 | 47.61 | |
| sodium alkyl ether sulfate (28%, 7 ethylene oxide units) | 22.23 | 18.19 | — | |
| methyl methacrylate | 217.84 | 407.38 | — | |
| butyl acrylate | 404.55 | 101.85 | — | |
| methacrylic acid | 18.67 | 5.09 | — | |
| acrylic acid | 9.40 | 2.60 | — | |
| n-dodecyl mercaptan | 12.45 | 0 | — | |
| ammonium persulfate | — | — | 3.50 | |
| Resydrol AZ 6191 w/42WA | | | | 1553.30 |

Example 5

Preparation of Polymer Composition 5 Based on a Homogeneous Acrylic Emulsion

A 3-liter reactor fitted with a condenser, mechanical stirrer and thermometer was filled with 647.6 g of water, 21.2 g of sodium alkyl ether sulfate (28%, 7 ethylene oxide units) and heated to 80° C. while stirring. At 80° C. 2.4% of Feed 1 was added to the reactor, followed by a solution of 0.59 g of ammonium persulfate in 15.8 g of water. After 15 minutes of initial polymerization at 80° C., the remaining part of Feed 1 was added to the reactor over 180 minutes. Feed 2 was added to the reactor parallel to the addition of Feed 1 over 180 minutes. The feed compositions are given in Table 5. After completion of the additions, temperature was maintained at 80° C. for 60 minutes after which 23.7 g ammonia (12.5%) was added the reactor. The reactor content was held at 80° C. for another 30 minutes, then cooled to below 40° C. and another 23.7 g of ammonia (12.5%) was added. Finally, Feed 3 was added at 50° C.

TABLE 5

|  | Feed 1 [g] | Feed 2 [g] | Feed 3 [g] |
|---|---|---|---|
| Water | 593.40 | 58.13 |  |
| sodium alkyl ether sulfate (28%, 7 ethylene oxide units) | 42.31 |  |  |
| methyl methacrylate | 663.37 |  |  |
| ethyl hexyl acrylate | 521.22 |  |  |
| methacrylic acid | 23.69 |  |  |
| acrylic acid | 11.85 |  |  |
| n-dodecyl mercaptan | 11.85 |  |  |
| ammonium persulfate |  | 5.33 |  |
| Resydrol AZ 6191 w/42WA |  |  | 1553.30 |

Comparison Example 6

A polymer composition was prepared as described for Example 5 but without using n-dodecyl mercaptan in Feed 1.

Preparation and Testing of High Gloss Paints

High gloss paints were prepared by mixing the ingredients shown in Table 6 at room temperature under stirring. For paint 1 the dispersion of example 1, for paint 2 the dispersion of example 2, for paint 3 the dispersion of example 3, for paint 4 the dispersion of example 4 and for paint 5 the dispersion of example 5, were used. As comparative paint 1 the dispersion of comparison example 6 was used and for comparison paint 2 the pure alkyd emulsion Resydrol AZ 6191 w/42wa was used.

TABLE 6

|  | Paints 1 to 5 Parts by weight | Comp. Paint 1 Parts by weight | Comp. Paint 2 Parts by weight |
|---|---|---|---|
| Grind: |  |  |  |
| Water | 11 | 11 | 11 |
| Polymeric dispersing agent (Byk 199) | 10 | 10 | 10 |
| Aminomethylpropanol | 2 | 2 | 2 |
| Defoamer based on polysiloxane (Byk 021) | 2 | 2 | 2 |
| Preservative (Mergal K 10 N) | 2 | 2 | 2 |
| 1,2-Propanediol | 40 | 40 | 40 |
| Titanium dioxide (Tronox CR 828) | 210 | 210 | 210 |
| Let down: |  |  |  |
| Polymer composition as per Examples 1 to 5 | 595 |  |  |
| Polymer composition as per Comparison Example 6 |  | 595 |  |
| Resydrol AZ 6191w/42WA |  |  | 649 |
| Texanol | 20 | 20 | 20 |
| Wax emulsion (Südranol 240) | 30 | 30 | 30 |

TABLE 6-continued

|  | Paints 1 to 5 Parts by weight | Comp. Paint 1 Parts by weight | Comp. Paint 2 Parts by weight |
|---|---|---|---|
| Polyurethane thickener | 25 | 25 | 25 |
| Water | 53 | 53 | 0 |

Characteristics: Solids content ca. 50.6%;
Pigment ratios: Dispersion: pigment/filler mixture ca. 1: 0.35
Binder solids: pigment/filler mixture ca. 1: 0.77
Pigment volume concentration (p.v.c.) ca. 17
Specific weight at 23° C. ca. 1.2 kg/L Testing of the paints summarized in Table 6 gave the results shown in Table 7:

TABLE 7

| Paint | Gloss 20°[1] | Gloss 60°[1] | Haze[2] | Blocking resistance[3] [g/6.25 cm2] |
|---|---|---|---|---|
| Paint 1 | 83 | 89 | 7 | 2060 |
| Paint 2 | 66 | 83 | 79 | 1520 |
| Paint 3 | 70 | 84 | 65 | 2680 |
| Paint 4 | 73 | 85 | 49 | 1270 |
| Paint 5 | 78 | 87 | 9 | 5000 |
| Comp. Paint 1 | 52 | 78 | 144 | 5000 |
| Comp. Paint 2 | 74 | 85 | 1 | 5000 |

[1] 300 μm high gloss paint applied to at room temperature to Polyester film, measured after 1 d with micro-TRI-gloss μ from Byk Gardner (DIN 67530).
[2] 300 μm high gloss paint applied to at room temperature to Polyester film, measured after 1 d with micro-haze plus from Byk Gardner (ISO 13803).
[3] To test blocking resistance, microscope slides (76 * 26 * 1 mm) from Marienfeld were coated in a wet-film thickness of 200 μm. After drying at 50° C. for 24 hours, two coated microscope slides were placed with their coated sides together and were subjected at 50° C. for 1 hour to a force of 2 kg. Subsequently the force required to separate the microscope slides was determined.

The results in Table 7 show that with the hybrid system based on the emulsions of the Examples 1-5 it is possible to achieve a similar gloss or even a higher gloss in comparison to the pure alkyd emulsion. Furthermore by using the multiphase emulsions from Examples 1 to 4 it is possible to improve the blocking resistance of the paint.

What is claimed is:

1. An aqueous polymer composition comprising a heterogeneous polymer dispersion prepared by a stepwise emulsion polymerization process comprising polymerizing in a first stage a first monomer composition comprising:
    (A1) from 50 to 80% by weight of at least one main monomer whose homopolymer has a glass transition temperature below about 0° C.;
    (A2) from 19.3 to 50% by weight of at least one main monomer whose homopolymer has a glass transition temperature above about 65° C.; and
    (B) from 0.5 to 5% by weight of at least one stabilising monomer selected from ethylenically unsaturated monocarboxylic acids or amides thereof, ethylenically unsaturated dicarboxylic acids or anhydrides or amides thereof, ethylenically unsaturated sulfonic acids, ethylenically unsaturated phosphoric acids, and ethylenically unsaturated phosphonic acids; and
    wherein the first polymerization stage is conducted in the presence of 0.05 to 3 wt %, based on the total weight of monomers in the first monomer composition, of a chain transfer agent (C) to produce a first polymer phase having a Tg less than or equal to 20° C.; and
    polymerizing in a second stage, and in the presence of the first polymer phase, a second monomer composition comprising:
    (A1) from 5 to 45% by weight at least one monomer whose homopolymer has a glass transition temperature below about 0° C.; and (A2) from 65 to 90% by weight at least one monomer whose homopolymer has a glass transition temperature above about 65° C. to produce a second polymer phase having a Tg of at least 40° C.

2. The aqueous polymer composition of claim 1, wherein the first polymer phase has a Tg less than or equal to 0° C.

3. The aqueous polymer composition of claim 1, wherein the second polymer phase has a Tg of at least 50° C.

4. The aqueous polymer composition of claim 1, wherein the difference in glass transition temperature between the first and second polymer phases is at least 20° C.

5. The aqueous polymer composition of claim 1, wherein the weight ratio of the first polymer phase to the second copolymer phase is from generally from 50:50 to 75:25.

6. The aqueous polymer composition of claim 1, wherein the monomers (A1) of the first and second monomer compositions are separately selected from the group consisting of $C_1$-$C_{12}$-alkyl esters of acrylic acid and $C_5$-$C_{12}$-alkyl esters of methacrylic acid.

7. The aqueous polymer composition of claim 1, wherein the monomers (A2) of the first and second monomer compositions are separately selected from the group consisting of styrene, vinyltoluene, acrylonitrile, methacrylonitrile, and C1-C4-alkyl esters or cycloalkyl esters of methacrylic acid.

8. The aqueous polymer composition of claim 1, wherein the second monomer composition further comprises up to 4% by weight, based on the total weight of monomers in the second monomer composition, of (B) of at least one stabilising monomer selected from ethylenically unsaturated monocarboxylic acids or amides thereof, ethylenically unsaturated dicarboxylic acids or anhydrides or amides thereof, ethylenically unsaturated sulfonic acids, ethylenically unsaturated phosphoric acids, and ethylenically unsaturated phosphonic acids.

9. The aqueous polymer composition of claim 1, wherein the second monomer composition further comprises up to 5% by weight, based on the total weight of monomers in the second monomer composition, of a chain transfer agent (C).

10. The aqueous polymer composition of claim 9, wherein the ratio of the amount of chain transfer agent used in the polymerization of the first monomer composition to the amount of chain transfer agent used in the polymerization of the second monomer composition is greater than 1:1.

11. The aqueous polymer composition of claim 1, wherein each of the first and second monomer compositions further includes up to 10% by weight of at least one ethylenically unsaturated functional monomer containing one or more carbonyl groups.

12. The aqueous polymer composition of claim 1, wherein the at least one chain transfer agent (C) comprises a mercaptan.

13. The aqueous polymer composition of claim 1, wherein the polymer dispersion has an average particle diameter size ranging from about 60 nm to about 150 nm.

14. The aqueous polymer composition of claim 1 and further comprising an aqueous autoxidable material comprising an alkyd resin.

15. The aqueous polymer composition of claim 14, wherein the polymer dispersion is present in an amount from about 50 weight percent to about 90 weight percent based on the total weight of the polymer composition and the aqueous autoxidable material is present in an amount from about 10 weight percent to about 50 weight percent based on the total weight of the polymer composition.

16. The aqueous polymer composition of claim 14, wherein the aqueous autoxidable material comprises an acrylic and urethane modified alkyd resin.

17. The aqueous polymer composition of claim 14, wherein the aqueous autoxidable material has an average particle diameter size of less than about 300 nm.

18. A coating composition comprising the aqueous polymer composition of claim 14.

19. The aqueous polymer composition of claim 1, wherein the first polymerization stage is conducted in the presence of 0.5 to 2 wt%, based on the total weight of monomers in the first monomer composition, of a chain transfer agent (C) to produce a first polymer phase having a Tg less than or equal to 20° C.

* * * * *